United States Patent [19]
Thebault et al.

[11] Patent Number: 5,686,144
[45] Date of Patent: Nov. 11, 1997

[54] METHOD FOR APPLYING AN ANTI-OXIDATIVE COATING ON BRAKE DISKS OF A CARBON-CONTAINING COMPOSITE MATERIAL

[75] Inventors: Jacques Thebault; Michel Laxague, both of Bordeaux; Jacques Rey, Merignac; Rodolphe Delaval, St. Martin au Laërt; Gérard Palavit, Douai, all of France

[73] Assignee: Societe Europeenne de Propulsion, Suresnes, France

[21] Appl. No.: 556,945

[22] PCT Filed: Apr. 5, 1995

[86] PCT No.: PCT/FR95/00431
 § 371 Date: Nov. 30, 1995
 § 102(e) Date: Nov. 30, 1995

[87] PCT Pub. No.: WO95/26941
 PCT Pub. Date: Oct. 12, 1995

[30] Foreign Application Priority Data

Apr. 5, 1994 [FR] France .................... 94 03972

[51] Int. Cl.⁶ .................... B05D 1/18; B05D 1/32
[52] U.S. Cl. .................... 427/282; 427/287; 427/294; 427/430.1
[58] Field of Search .................... 427/259, 282, 427/287, 294, 431, 443.2, 430.1

[56] References Cited

U.S. PATENT DOCUMENTS

| | | | |
|---|---|---|---|
| 3,850,669 | 11/1974 | Mino et al. | 117/48 |
| 4,454,193 | 6/1984 | Block | 428/322 |
| 4,550,034 | 10/1985 | Shimrock et al. | 427/294 |

FOREIGN PATENT DOCUMENTS

| | | |
|---|---|---|
| 0365235 | 4/1990 | European Pat. Off. . |
| 0495583 | 7/1992 | European Pat. Off. . |
| 2334013 | 7/1977 | France . |
| 2525207 | 10/1983 | France . |
| 1596487 | 3/1970 | Germany . |
| 1554994 | 4/1979 | United Kingdom . |
| WO9313033 | 7/1993 | WIPO . |

*Primary Examiner*—Katherine A. Bareford
*Attorney, Agent, or Firm*—Weingarten, Schurgin, Gagnebin & Hayes LLP

[57] ABSTRACT

Each friction face of a brake disk (10) is masked (plates 40, 46) to isolate and seal the exterior from liquids, and the disk is immersed in a bath (30) of impregnating composition containing at least one substance which can form a protective layer against oxidation. Impregnation is effected by establishing a pressure difference between the pressure at the exterior of the exposed surfaces of the immersed brake disk (10) and the pressure inside the internal open pore space of the brake disk, without completely evacuating the latter, to force the impregnating composition to penetrate into the internal open pore space of the disk to a certain depth from the exposed surfaces, to form an internal oxidation protection. The pressure difference is adjusted depending on the desired depth of penetration of the impregnating composition into the internal open pore space.

43 Claims, 7 Drawing Sheets

METHOD FOR APPLYING AN ANTI-OXIDATIVE COATING ON BRAKE DISKS OF A CARBON-CONTAINING COMPOSITE MATERIAL

FIELD OF THE INVENTION

This is a national stage application of PCT/FR95/00431, filed Apr. 5, 1995.

The present invention concerns protecting carbon-containing composite material brake disks against oxidation.

BACKGROUND OF THE INVENTION

Carbon-containing composite material brake disks are well known and are used in particular in the brakes of aircraft and racing vehicles. They have the advantage of offering good tribological characteristics up to relatively high temperatures, and they have excellent mechanical strength for a specific gravity which is far lower than that of conventional solid disks, in particular metal disks.

Of the carbon-containing composite materials used for the manufacture of brake disks, a carbon-carbon composite material is currently the most popular. It comprises a reinforcing piece, or preform, constituted by carbon fibers, for example in the form of superimposed layers of carbon fabric which may be bound together by needling, the reinforcing piece being densified by a carbon matrix. However, other carbon-containing composite materials have been suggested for use in a brake disk, in particular materials reinforced with carbon fibers and having a ceramic matrix (for example silicon carbide) or a mixed carbon and ceramic matrix, also materials which are reinforced with ceramic fibers and which have a ceramic matrix, with the interposition of a matching or interphase layer of pyrolytic carbon between the fibers and the matrix.

A brake disk essentially comprises two zones: a first zone constituted by its friction face(s) and a second zone constituted by that which does not constitute the friction face. In the first zone, the tribological characteristics of the material constituting the disk are the most important. The second zone mainly corresponds to the portion of the disk which carries out the mechanical functions of fixing the disk and stress recovery. It is essential to maintain the integrity of the material constituting the disk in the second zone. Further, in the case of brake disks made of carbon-containing composite material, effective oxidation protection must be provided in the second zone, since the disks normally heat up in use to a temperature which falls within the carbon oxidation range, i.e., a temperature of more than 350° C. In the absence of any oxidation protection, the disappearance of carbon in the zone in the disks which carries out a mechanical function will change its mechanical properties, and could lead to the fixing or stress recovery portions breaking. Weight loss in carbon-carbon composite material disks caused by the oxidation of carbon makes this obvious. This is the case also when the carbon is present only in the reinforcing fibers, due to the role played by the fibers as regards the mechanical properties of the material, and when the carbon is present only in a pyrolytic carbon interphase between the fibers and the matrix, the interphase being essential to the mechanical properties, as described in European patent EP-A-0 172 082.

Regardless of the method of manufacture of the composite material—impregnation of a fibrous preform with a liquid composition containing a matrix precursor (for example, a resin) followed by transformation of the precursor by heat treatment, or densification of a fibrous preform by a matrix deposited in the core of the preform by chemical vapor infiltration—the material produced has residual open pore space throughout its volume.

Protecting carbon-containing composite materials which have such pore space against oxidation, and also protecting porous solid carbon or graphite against oxidation, has given rise to a great deal of prior art.

In general, oxidation protection is in the form of a layer of refractory material such as a carbide, nitride, boride or oxide. The layer can be self-healing or it can be completed by a layer with such a property. Self-healing materials which are in current use are glass-containing compositions, the term "self-healing" here meaning the ability of a material, by becoming viscous in the working temperature range, of filling in microcracks or similar faults which can appear in the protection.

Two types of processes can be used, either alone or in combination, to constitute a protective barrier against oxygen from the surroundings:

formation of an external protection by coating the surface; this can be produced by applying a liquid or fluid composition which, after drying or solidification and any required chemical treatment, provides the desired external protection, or by chemical vapor deposition, or by plasma spraying, etc., or forming an internal protection in the open pore space of the substance; this internal protection can be effected by impregnating the substance with a liquid composition which, again after drying or solidification and any required heat treatment, provides the desired internal protection.

In the case of carbon-carbon brake disks, the formation of an external protective layer, by applying a surface coating to the non-friction portions of the disks, is known. French patent FR-A-2 334 013 can be referred to as an example. The protective layer must not, however, be applied to the friction faces. If that were the case, the material of the layer protecting against oxidation would control the tribology rather than the carbon-carbon material selected for the job. Further, even if the material of the protective layer were suitable as regards tribology, frictional wear would result in its gradual disappearance and an abrupt transition to the carbon-carbon material. Such an unpredictable change during use of the brake disks would be unacceptable.

The use of external protection, even if limited to the non friction portions, causes problems. The slightest fault in the continuity of a surface coating produced during its formation, for example a pinhole, or localized peeling during use, or an accidental shock, would provide access for oxygen from the surroundings. Oxidation could then take place beneath the external protective coating, which would then remove the substratum and exacerbate peeling of the coating.

In addition, on the border between a frictional surface with no external protection and a portion of the disk which has external protection, the same phenomenon of subjacent oxidation can occur and the adjacent protection can be eliminated when the friction face wears. Elimination of these problems by providing the external protection or a complementary layer associated therewith with a self-healing character cannot be considered. This would result in the surface of the disks in zones used for mechanical mounting of the disks or for stress recovery becoming viscous. In addition, even if oxidation protection formed by applying a surface coating to the non friction portions was effective at the beginning of the service life of the brake disk, degradation can be rapid and lead to premature scrapping.

Internal protection fixed in the open pore space of the material would not have these drawbacks, since this type of properties can be provided with self-healing properties.

Some processes for forming an internal oxidation protection by impregnating the pore space of carbon-containing composite materials or solid carbon or graphite are known and are effective. When applied to brake disks, the problem arises of introducing the internal protection uniformly, and thus also in the pore space adjacent the friction faces. It has been shown that the presence of internal protection in the pore space adjacent the friction faces degrades the tribological properties permanently, even as the friction faces wear down.

SUMMARY OF THE INVENTION

The aim of the invention is to provide a process in which oxidation protection can be provided in a brake disk of carbon-containing composite material without encountering the problems described.

More particularly, the aim of the invention is to provide a process by which a durable and effective oxidation protection can be applied to the non friction portions of a brake disk of carbon-containing composite material without altering the tribological characteristics of the material in the friction portions.

This aim is achieved in a process which comprises the following steps:

masking each friction face of a brake disk to seal and isolate it from the exterior from liquids;

immersing the brake disk in a bath containing an impregnating composition containing at least one substance which can form a protective layer against oxidation; and impregnating by establishing a pressure difference between the exterior of the exposed surfaces of the immersed brake disk and the interior of the open internal pore space of the brake disk, without totally evacuating the air contained therein, to force the impregnating composition to penetrate into the open internal pore space of the disk to a certain depth below the exposed surfaces, to form an internal oxidation protection.

The pressure difference is advantageously adjusted as a function of the desired depth of penetration of the impregnating composition into the open pore space. The penetration depth is limited to avoid the presence of an internal protection in the portion adjacent each friction face which is not in the proximity of the border between the friction face and the non friction face portion. Depending on the dimensions of the disk, the penetration depth can be between about 2 millimeters (mm) and about 10 mm.

The pressure difference for impregnation can be established:

by subjecting the exposed surfaces of the immersed brake disk to a pressure above the initial ambient pressure in the open internal pore space of the disk; or by subjecting the internal open pore space of the disk to a pressure which is lower than the initial pressure; or a combination of these methods.

In the first case, an overpressure can be produced by immersing the brake disk in a bath of impregnating composition in a vessel in which an overpressure has been established. It is also possible to immerse the brake disk so that the height of the liquid above it depends on the desired overpressure. When the impregnated disk is removed from the impregnating bath, it is important that the impregnating composition which has penetrated into the internal pore space of the disk is not expelled during re-equilibration of the pressure between the interior and exterior of the disk. The small dimensions of the pore space mean that capillary forces and surface tension are sufficient to counter expulsion, pressure re-equilibration being effected via a macropore space which is practically always present. It is preferable, however, to use an impregnating composition with a fairly low viscosity without being too high, so that impregnation can be effected without the need for a large pressure difference. The viscosity is, for example, between about 0.1 dPa.s and about 10 dPa.s, preferably between 0.1 dPa.s and 1 dPa.s.

In the second case, the underpressure can be established by connecting the bath in which the disk is immersed with a vacuum source to reduce the pressure in the open pore space of the disk without completely evacuating the air it initially contains, the bath then being returned to ambient pressure or to a pressure above ambient pressure. The underpressure can also be established by placing at least one masked friction face of an immersed disk in communication with a vacuum source. Maintaining the underpressure after impregnation avoids expulsion of the impregnating composition, even if it has a low viscosity, until the composition has dried or solidified.

If a constant and uniform penetration depth from the exposed surfaces is desired throughout the accessible internal pore space, means can be provided to rotate the disk about a horizontal axis in the impregnating composition bath.

The annular friction face of each disk can be sealed in different ways.

Each friction face can be provided with a plate which is applied to it and is liquid tight at least at the edges of the friction face. The plate can be rigid and provided with seals along the edges of the friction face. The plate may be rigid or non rigid and comprise beads forming seals provided at the edges of the friction face. It is also possible to use a plate in the form of a sheet of elastically deformable material pressed against the friction face. In all these cases, the sealing plate applied against the friction face can be held in place by a clamping apparatus.

In a variation, each friction face is sealed by applying a sealed coating layer. This can be formed by any means used to provide surface protection, in particular by spraying or painting on a liquid composition such as a solution or suspension which is then dried and optionally heat treated, or by plasma spraying. Elimination of the surface coating is effected before installation of the disk, for example by machining (grinding). It is also possible to deposit a rubber or elastomeric paste on each surface to be masked then vulcanizing it, the coating formed then being peeled off after producing the internal protection.

Preferably, several brake disks are simultaneously immersed and impregnated, each friction face being masked, the disks being disposed coaxially and assembled in a clamping apparatus. Two facing friction faces can be masked using a single plate which is applied to and is liquid tight at least at the edges of each of the two friction faces.

A brake disk for mounting at one extremity of a pack of stator disks alternating with rotor disks in a multi-disk brake comprises a non friction outer surface opposite an inner friction face. Application of an internal protection to the non friction portions may necessitate at least partial masking of the outer non friction face by the apparatus used to mask the inner friction face and/or to hold several assembled disks. In this case, after formation of the internal oxidation protection, the external non friction face can be provided, in known fashion, with a surface coating which protects against oxidation.

Impregnating brake disks to form an internal oxidation protection can be carried out using an impregnating composition comprising:

a solution of precursors of the constituent material of the internal protection; or a suspension of precursors of the constituent material of the internal protection; or a mixture of molten constituents of the internal protection.

When the impregnating composition is a solution or suspension of precursors of the internal protection, this latter is produced by heat treatment carried out after drying the impregnated disks.

Advantageously, the internal protection is in the form of a glass-containing composition which preferably has self-healing properties in the operating range of the brake disks, i.e., a composition with a relatively low glass transition temperature $T_g$. The term "glass-containing composition" here means a glass proper, or a composition which melts as a glass but in which a crystalline phase may appear on cooling or over time, causing partial devitrification (a glass containing crystalline grains). In order to ensure effective protection from the beginning of the carbon oxidation range, i.e., from about 350° C., a glass-containing composition in which $T_g$ is between about 250° C. and about 350° C. can be selected. The composition retains its self-healing properties over a range of temperature of about 500° C., giving effective oxidation protection between about 250° C. to 350° C. and about 750° C. to 850° C. When the glass-containing composition is heated to a higher temperature, the viscosity becomes low with a risk of too much fluidification of the internal protection. As a consequence, if effective protection is required up to 900° C. to 1000° C., the glass-containing composition of the internal protection is selected so as to have a $T_g$ of between about 400° C. and 500° C. A lack of effectiveness of the protection must then be tolerated right at the start of the carbon oxidation range, which is not a great problem since the oxidation kinetics are still low.

Examples of glass-containing compositions with a relatively low $T_g$ which may be suitable are phosphate based compositions which are known per se, i.e., compositions in which the principal oxide forming the glass matrix is $P_2O_5$. Particular reference is made to United States patents U.S. Pat. No. 3,351,477, U.S. Pat. No. 4,292,345 and French patent FR-A-2 685 694. Phosphates, whether glasses or otherwise, have the additional advantage of acting as a counter-catalyst to the catalytic oxidation of carbon.

The residual internal pore space in composite materials for brake disks is small in dimension, since the initial pore space of the fibrous preform has been largely filled in by the matrix. Deep impregnation by a suspension can thus be difficult to carry out in practice, since the solid particles have a tendency to aggregate on the surface. The use of an impregnating composition comprising molten constituents of the internal protection also has its difficulties. The viscosity of the composition requires the use of relatively high pressures in order to penetrate into pores with small dimensions, also the use of high temperatures.

It is thus preferable to impregnate the disks with a completely dissolved solution of precursors of the internal protection, advantageously an aqueous solution.

Aqueous solutions containing precursors of an oxidation protection for impregnating porous carbon-containing materials in order to form an internal protection are already known.

Thus, FR-A-2 685 694 describes an aqueous solution of sodium and potassium phosphates. However, one problem of the internal protection produced is its sensitivity to moisture. For brake disks, it is preferable that the internal protection is highly resistant to corrosion by water.

The same problem is encountered with the phosphate based glass produced by the process described in U.S. Pat. No. 3,351,477 cited above. That glass contains a certain amount of modifying oxide ZnO, but in far too low a proportion to render it insensitive to moisture. Further, the method described in that document does not allow for the proportion of zinc oxide in the glass to be increased by increasing the proportion of zinc oxide or its precursor zinc phosphate, in the impregnating solution, since the solution becomes unstable with the formation of phosphate precipitates.

Advantageously, the impregnating composition contains, in an aqueous solution, precursors of a phosphate based glass-containing composition with the following composition in moles of oxides:

20% to 60%, preferably 20% to 50%, of $P_2O_5$;

10% to 30% of ZnO;

10% to 30% of $Na_2O$;

0 to 20% of at least one oxide selected from CuO, CoO, NiO, FeO, MgO and PbO;

0 to 15% of at least one alkali metal oxide selected from $Li_2O$ and $K_2O$;

0 to 20%, preferably 0 to 15%, of at least one oxide selected from $Bi_2O_3$, $Al_2O_3$ and $B_2O_3$; and 0 to 5% of at least one oxide selected from $V_2O_5$ and $TiO_2$.

The molar ratio between the glass modifying oxides, comprising zinc oxide, and the glass forming oxides, principally comprising or consisting of $P_2O_5$, is preferably sufficiently high to confer resistance to corrosion by moisture on the glass-containing phosphate base.

The molar ratio between the glass modifying oxides and the glass forming oxides which must be achieved to obtain high resistance to corrosion by moisture depends on the nature of the constituents of the glass-containing base, in particular the modifying oxides present with the zinc oxide. In a $ZnO/P_2O_5$ system, the molar ratio between the ZnO and the $P_2O_5$ is preferably greater than one. In fact, the corrosion rate is divided by a factor of about 100 when the molar ratio between ZnO and $P_2O_5$ passes from a value slightly below one to a value slightly greater than one. In a system comprising other forming and/or modifying oxides in addition to ZnO and $P_2O_5$, the minimum value of the molar ratio between the modifying oxides and the forming oxides can be less than one. It appears, however, to be preferable that this ratio is at least 0.6 at all times, and better still at least 0.9.

The choice of the phosphate which is dissolved first in the water is essential in order to allow the subsequent dissolution of the desired quantity of precursor salts of the modifying oxides, and also to produce a high concentration of all the precursors in the solution, without compromising its stability. Phosphoric acid is excluded, as this cannot produce a stable solution with the desired proportions and concentrations of modifying oxide precursor salts. Thus, while in U.S. Pat. No. 3,351,477 cited above, a high concentration of precursors in the impregnating solution without compromising the stability of the solution was sought, the fact that phosphoric acid is dissolved first means that the molar ratio between ZnO and $P_2O_5$ can only reach 0.5, i.e., a value which is far too low to produce good resistance to corrosion by moisture in the internal protection produced. Further, phosphoric acid can be unstable during heat treatment and its residual presence in the glass also tends to limit moisture resistance.

The phosphate which is dissolved first is preferably a polyphosphate, advantageously sodium metaphosphate or sodium trimetaphosphate, which allows the required proportion of precursors to dissolve by complexing the cations which are subsequently produced.

The precursor salt for zinc oxide, preferably zinc nitrate or zinc sulfate, is introduced next into the solution.

It is thus possible to obtain a completely dissolved, stable impregnating solution with a high concentration of precursors for the glass-containing base, the proportion by weight of these precursors in the solution being greater than or equal to 50%.

The viscosity of the solution must, however, be sufficiently low to allow deep impregnation into the material, in particular when the accessible open pore space has small dimensions, as is the case for solid carbons and graphites or carbon-containing composites. As already indicated, the viscosity is typically in the range 0.1 dPa.s to 10 dPa.s, preferably in the range 0.1 dPa.s to 1 dPa.s.

The stability of the solution can be improved still further while keeping the acidity fairly high, preferably at a pH of less than 0.5. This acidity is achieved by adding suitable complementary precursors, for example potassium dihydrogen phosphate.

In order to improve the stability, one or more organic stabilizing agents with a fugitive nature can be added to the precursors, i.e., totally eliminated during the final heat treatment. Particular examples of these fugitive stabilizing agents are oxalic acid, tartaric acid and citric acid.

Other precursors are added to the solution depending on the desired composition of the glass-containing base, for example oxide precursors such as: copper, cobalt, nickel, iron, magnesium and/or lead oxides, lithium and/or potassium oxide precursors, bismuth, aluminium and/or boron oxide precursors, and vanadium and/or titanium oxide precursors.

In order to obtain the desired proportion of phosphoric anhydride in the glass-containing base, a precursor of this oxide, for example ammonium phosphate, can be added to the solution.

BRIEF DESCRIPTION OF THE DRAWINGS

Particular embodiments of the present invention will now be described by way of non limiting illustration, with reference to the accompanying drawings in which.

DETAILED DESCRIPTION OF THE INVENTION

Figure 1:
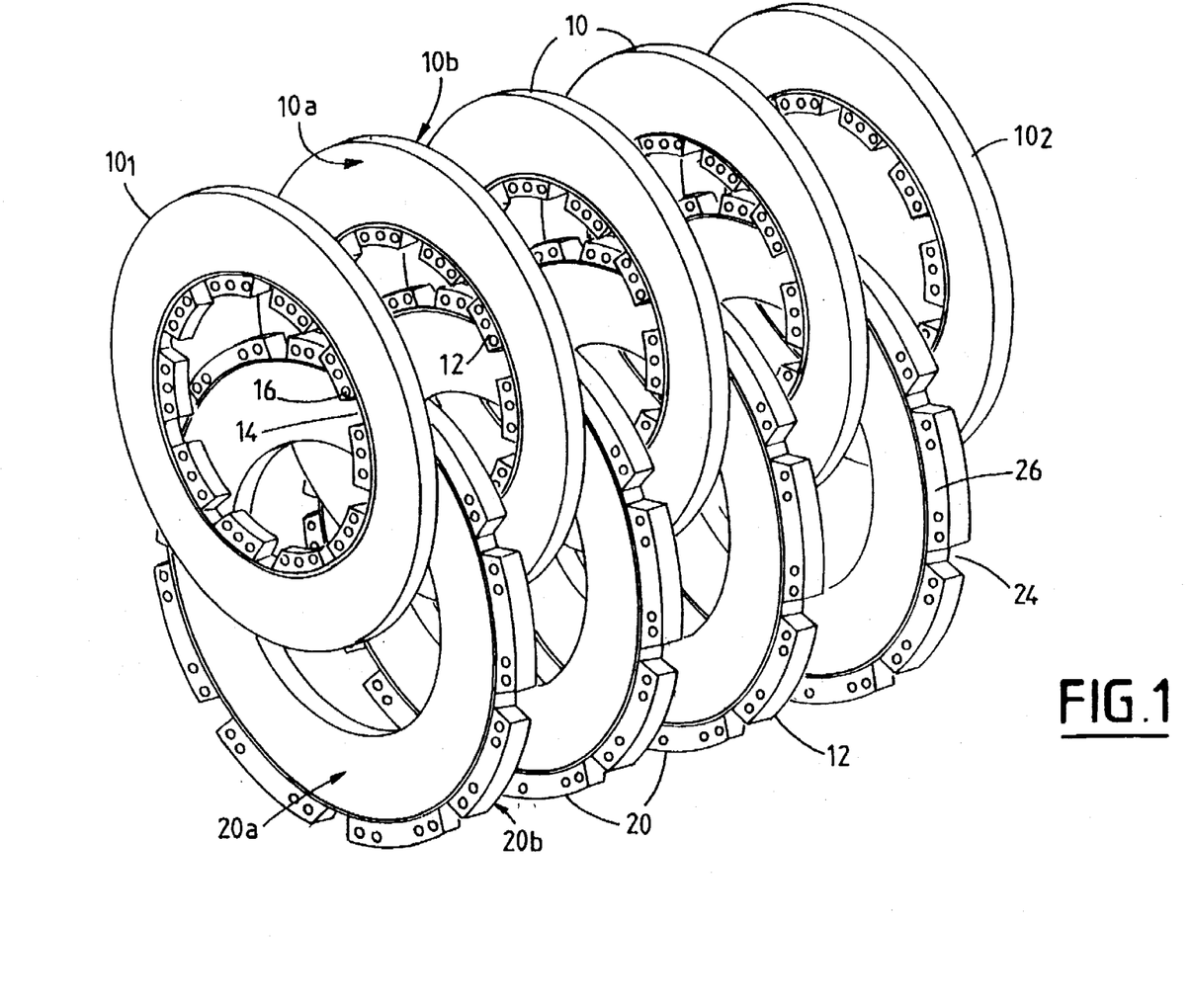
FIG. 1 is an exploded view of an assembly of stator disks and rotor disks for a multiple-disk brake.

A multiple-disk brake of carbon-containing composite material, for example of carbon-carbon composite material, in particular for forming an aircraft brake, comprises stator disks 10 alternating with rotor disks 20, as shown in FIG. 1.

Stator disks 10 (FIGS. 1 and 2) have opposed annular faces 10a, 10b and a ring 12 around their inner circumference which has serrations or notches 14 which cooperate with the channels in a fixed hub (not shown). Ribs 16 between two notches can be provided with holes in which metal callipers can be fixed if required, in known fashion. With the exception of end stator disks $10_1$ and $10_2$, each stator disk has opposed surfaces 10a, 10b which constitute the friction faces. Only the inner surfaces of the end stator disks $10_1$ and $10_2$ are friction faces. The outer surfaces cooperate with plates (not shown) of a hydraulic means which clamps the disks together when the brakes are applied.

Rotor disks 20 (FIGS. 1 and 3) have two opposed friction faces 20a, 20b and a ring 22 around their internal circumference which has serrations or notches 24 which cooperate with the inner channels in a sleeve (not shown) which is fixed in rotation with a wheel. Ribs 26 between two notches can be provided with holes in which metal callipers can be fixed if required, in known fashion.

Figures 2, 3, 13:
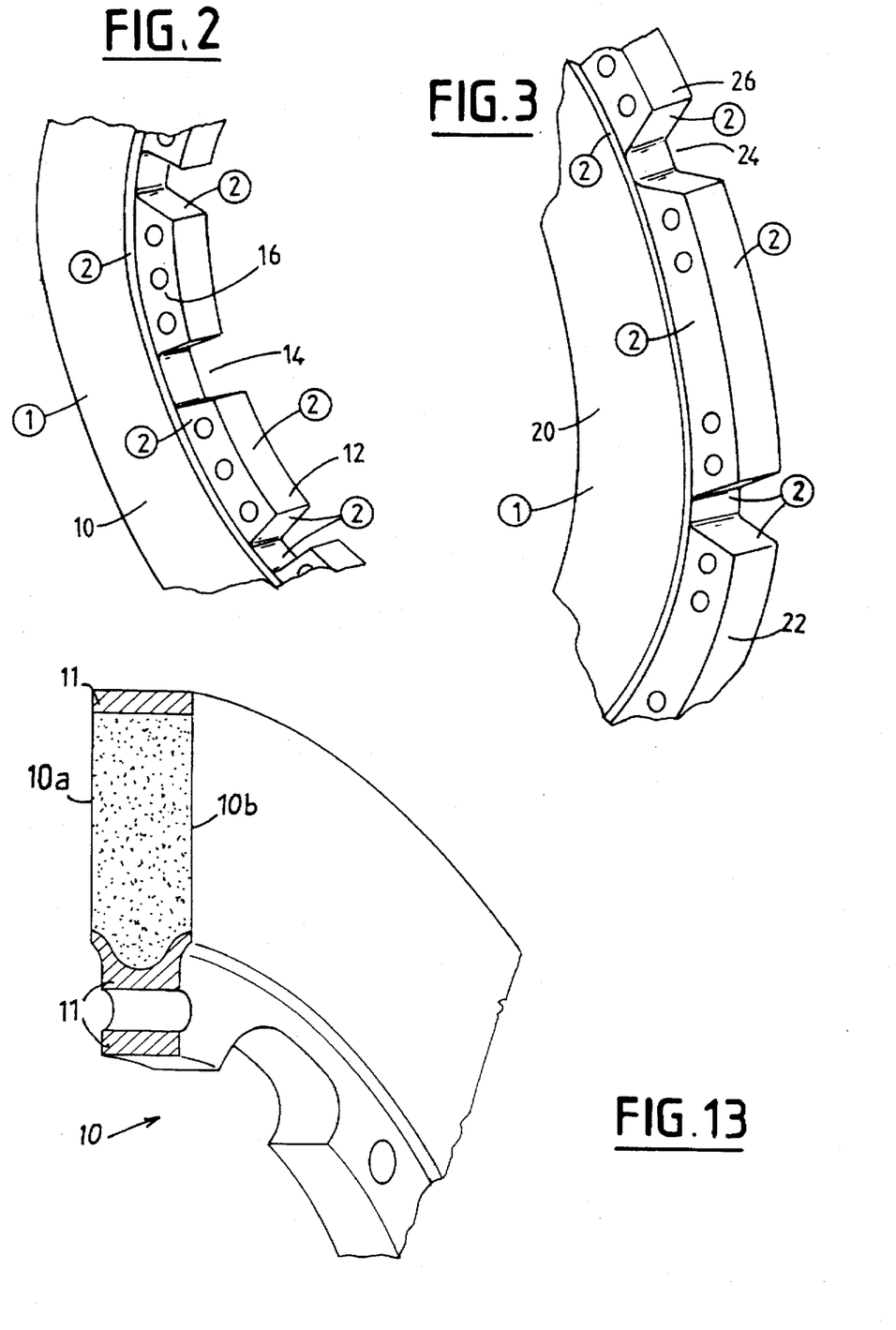
FIG. 2 is a detailed view on a larger scale of a portion of the outer diameter of a stator disk from FIG. 1.
FIG. 3 is a detailed view on a larger scale of a portion of the inner diameter of a rotor disk from FIG. 1.
FIG. 13 is a detailed view in cross-section of a brake disk provided with an internal oxidation protection in accordance with the invention.

In FIGS. 1, 2 and 3, circled reference numeral 1 designates a friction face while circled reference numeral 2 designates a portion of the non friction face. The non friction portions are constituted by all the disk surfaces with the exception of the friction faces.

In accordance with the invention, internal oxidation protection is effected by impregnation of the internal open pore space of the disks, after masking the friction faces.

Figure 4:
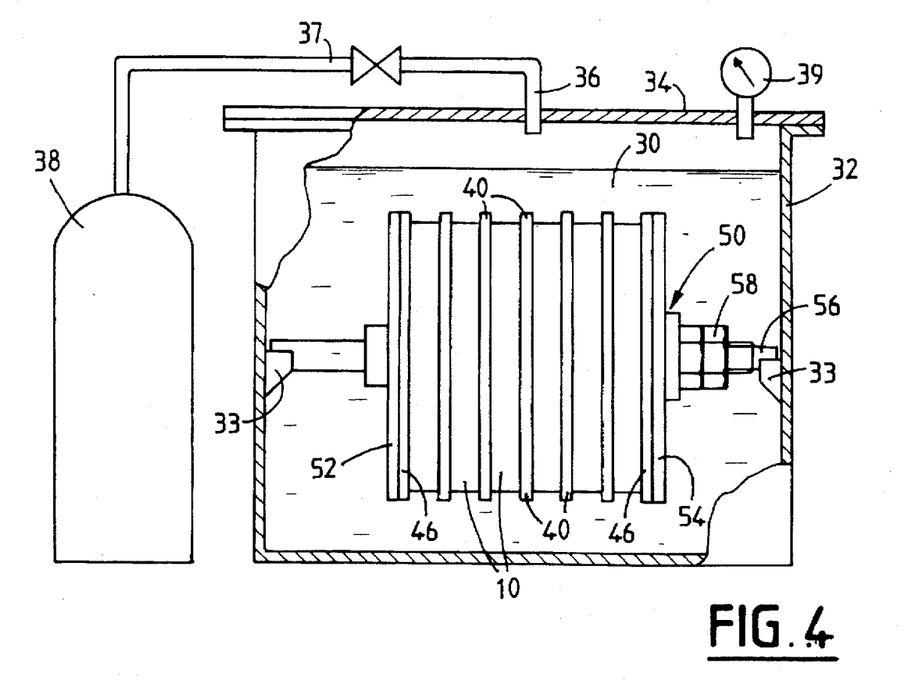
FIG. 4 is a schematic view illustrating a first implementation of the process of the invention.

In the embodiment illustrated in FIG. 4, an assembly of stator disks 10 is immersed in a bath 30 of an impregnating composition in a tank 32. The friction faces of disks 10 are masked and sealed against liquids by means of intermediate plates 40 and end plates 46. Plates 40, 46 are applied to the friction faces and are liquid tight at least along the inner and outer edges of the friction faces by means of an apparatus 50 which clamps the coaxially disposed disks together. Apparatus 50 comprises two plates 52, 54 which are applied against sealing plates 46 located at the ends of the disk assembly. Plates 52, 54 are connected by an axial rod 56 which is solid with one (52) of the plates and passes through the axial passages of the disks and a central orifice formed in the other plate (54). The end of rod 56 is threaded to allow mutual tightening of the plates by means of nuts 58. Apparatus 50 rests on supports 33 which are fixed to the walls of tank 32.

Figure 5:
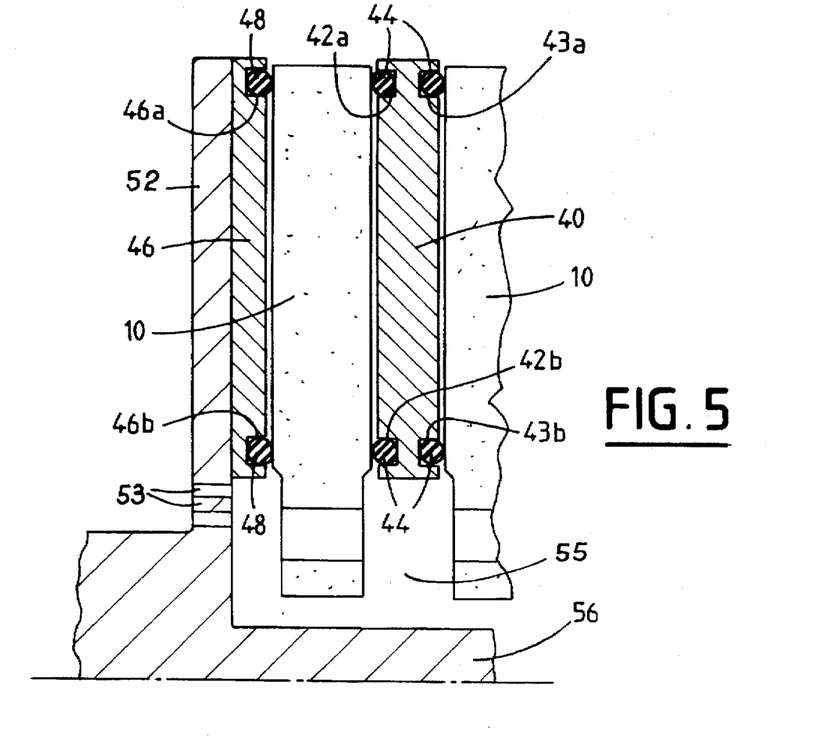
FIG. 5 is a partial view on a larger scale and in cross-section of the assembly of disks from FIG. 4 with their friction faces masked and mounted in a clamping apparatus.

As shown in more detail in FIG. 5, sealing plates 46 are fluid-tight rigid annular plates, for example of metal, plastics material or composite material. Annular grooves 46a, 46b are formed near their inner and outer circumferences, in the faces which are towards the disks. Rubber O-rings 48 are located in grooves 46a, 46b and seal against the inner and outer edges of adjacent friction faces.

FIG. 5 shows passages 53 through plate 52 to allow access of the impregnating composition into space 55 between axial rod 56 and the assembly of disks and annular sealing plates around the rod. Similar passages can be formed in plate 54. In a variation, access of the impregnating composition into space 55 close to the inner edges of the disks can be allowed through radial perforations in rod 56.

Intermediate sealing plates 40 are fluid-tight rigid plates, also of metal, plastics material or composite material. Annular grooves 42a, 42b, 43a, 43b are formed in each surface near their inner and outer circumferences. Rubber O-rings 44 are located in grooves 42a, 42b, 43a, 43b and seal against the inner and outer edges of adjacent friction faces.

Both at the inner circumference and at the outer circumference, plates 40 and 46 slightly overlap the adjacent friction faces.

Figure 6:
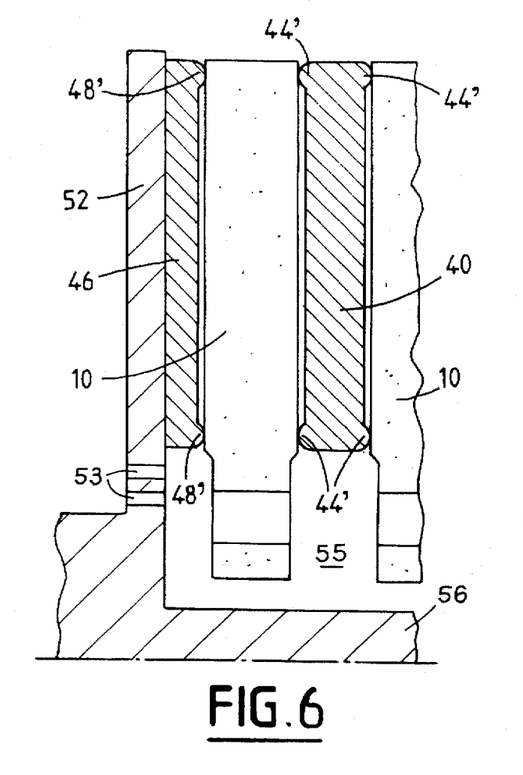
FIG. 6 is a detailed cross-sectional view showing a first variation of masking a friction face of a disk.

In a variation, as shown in FIG. 6, the faces of end plates 46 which are turned towards the disks are provided with elastic beads 48'. These are formed as a single piece with plates 46, for example by molded rubber, or are glued to plates 46; the latter may or may not be rigid. Similarly, each surface of intermediate plates 40 is provided with elastic edges 44' formed as a single piece with plates 40, for example by molded rubber, or are glued to plates 40; the latter may or may not be rigid. Beads 48', 44' are located along the inner and outer circumferences of plates 46, 40. In their non deformed state, they may have a rectangular or rounded cross-section.

Figure 7:
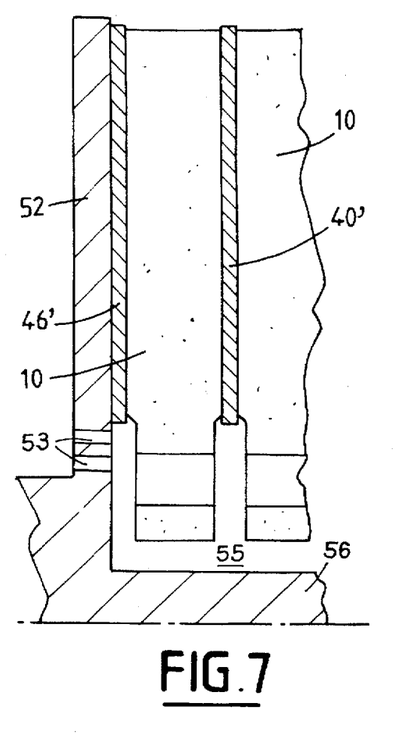
FIG. 7 is a detailed cross-sectional view showing a second variation of masking a friction face of a disk.

In a further variation shown in FIG. 7, the end plates 46' and intermediate plates 40' are simply constituted by elastically deformable annular sheets, for example of rubber. It is important to distribute the clamping pressure correctly to ensure a seal along the inner and outer circumferences of the sealing plates.

It is also possible to seal each friction face by forming a surface coating, for example by spraying or atomizing a non porous layer, or by spreading on and drying a layer of rubber paste which can subsequently be peeled off.

In the installation shown in FIG. 4, impregnation of the disks in bath 30 is effected under pressure. Tank 32 is sealed by cover 34 through which a line 36 passes which connects tank 32 with a pressure source 38 via valve 37. A manometer 39 measures the pressure inside tank 32. Opening valve 37 allows a pressure which is greater than that which is initially in the internal pore space in the disks to be applied to the exposed surfaces of the disks, i.e., all the unmasked surfaces. This pressure difference dP causes the impregnating composition to penetrate into the disks from the exposed surfaces until the pressures between the exposed surfaces and the core of the internal pore space of the disks in which the air initially contained is still present, is equilibrated. The depth of penetration is a function of the initial volume of the internal open pore space of the disks and the pressure difference dP. For a given disk, the pressure difference dP is thus adjusted to obtain the desired depth of penetration. This must be sufficient to allow formation of a deep oxidation protection, but must also be limited to avoid significant impregnation of the internal pore space adjacent to the masked friction faces. Depending on the dimensions of the disks, the penetration depth is between about 2 mm and about 10 mm.

The overpressure in tank 32 is held for a period sufficient to ensure impregnation to the desired depth, for example for at least 5 minutes.

After impregnation, the disks are removed from bath 30. Before removal of the disks, a pressure exists in the core of the disks which is higher than the ambient pressure. Re-equilibration of the pressures after removal of the disks occurs through the macroporosity which is always present in the material forming the disk. The capillary forces and surface tensions are sufficient, because of the small dimensions of the impregnated pore space, to counter expulsion of the impregnating composition which has penetrated into the pore space of the disk. It is preferable, however, to ensure that the viscosity of the impregnating composition is not too low, preferably greater than 0.1 dPa.s. This viscosity must also not be too high since that would render impregnation difficult; it must thus be less than 10 dPa.s, preferably less than 1 dPa.s.

When the impregnating composition is formed from molten constituents of the internal protection, it sufficient to await solidification.

When the impregnating composition is formed from precursors of the internal protection in suspension or solution, the impregnated disks are dried, for example in an oven, then heat treated to transform the precursors. With phosphate based glass-containing compositions, heat treatment is generally carried out by gradually raising the temperature to about 350° C. to 950° C.

Figure 8:
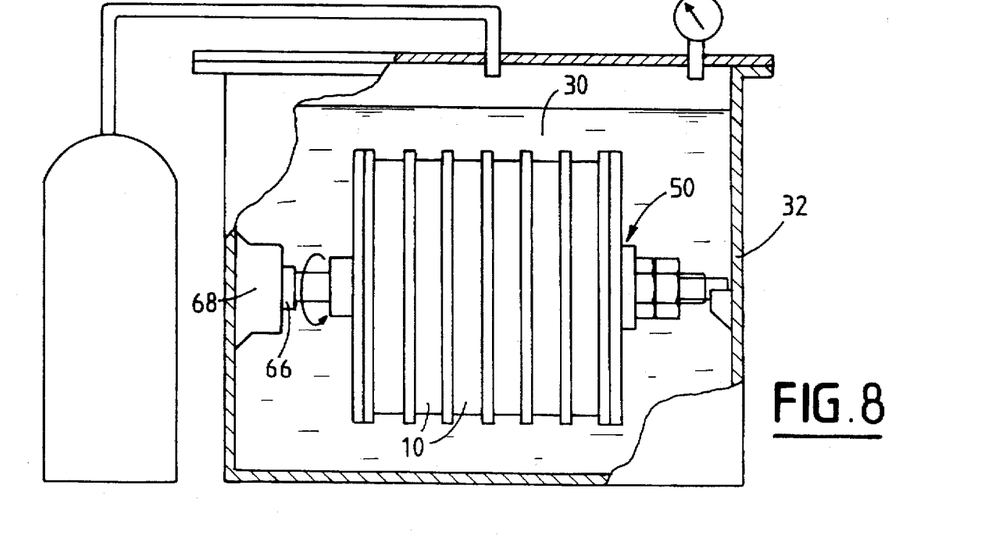
FIG. 8 is a schematic view illustrating a variation of the first implementation of the process of the invention.

When a constant and uniform impregnation depth is required, the variation of the pressure in the tank with depth must be compensated for. To this end, as shown in FIG. 8, the disks are mounted coaxially on a horizontal axis, and the apparatus 50 is coupled to the drive shaft of an immersed motor 68 which slowly rotates the disks about their axis.

Figure 9:
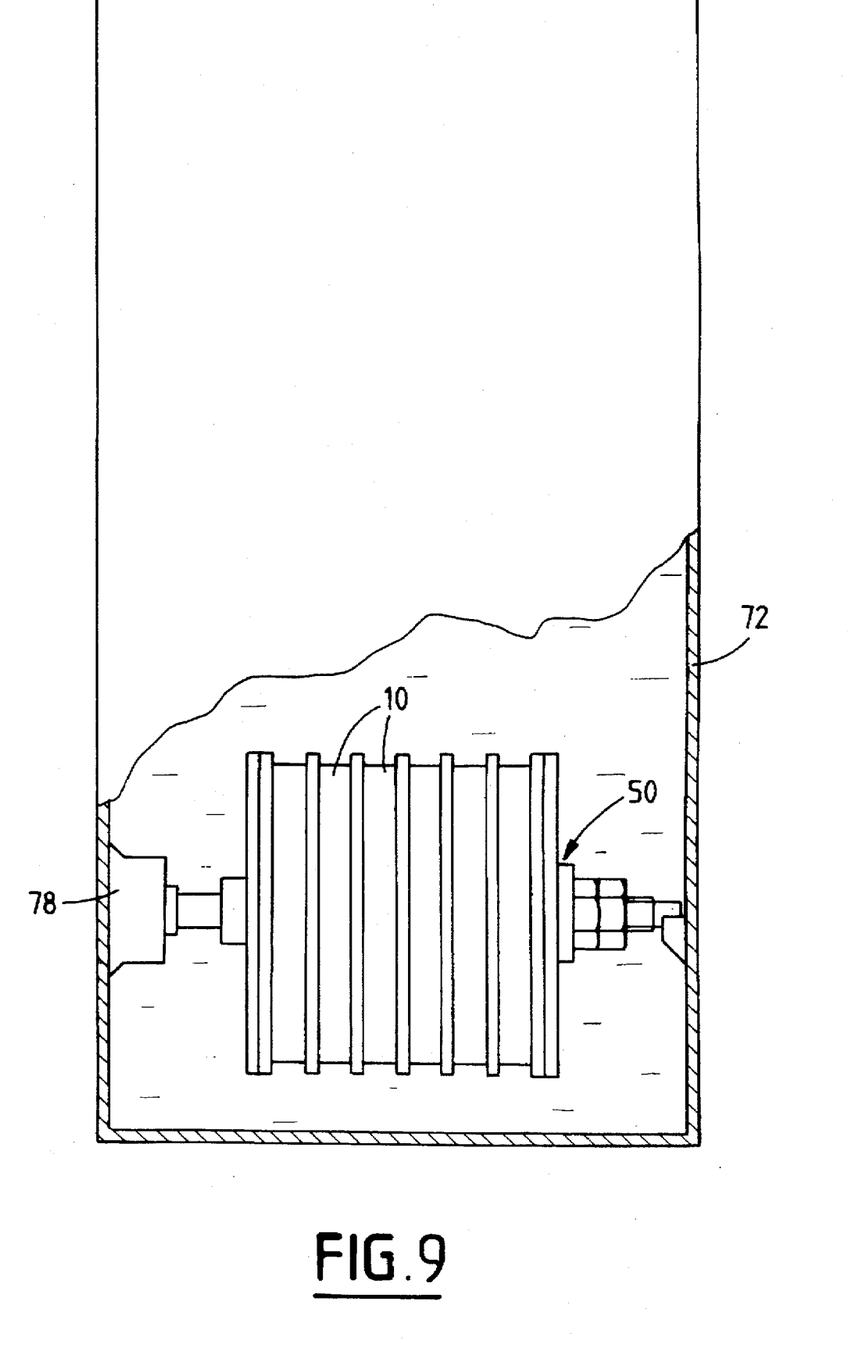
FIG. 9 is a schematic view illustrating a second implementation of the process of the invention.

A sufficient impregnation depth can be obtained with a pressure difference dP which is relatively low, for example of the order of one tenth of an atmosphere ($10^4$ Pa). This overpressure can be obtained by immersing the disks to a suitable depth in a tank 72 filled with impregnating composition, as shown in FIG. 9. The disks are mounted coaxially in apparatus 50 which is coupled to the drive shaft of an immersed motor 78. Rotating the disks in the bath makes the effect of the overpressure acting on the exposed surfaces of the disks uniform and thus makes the impregnation depth uniform.

Figure 10:
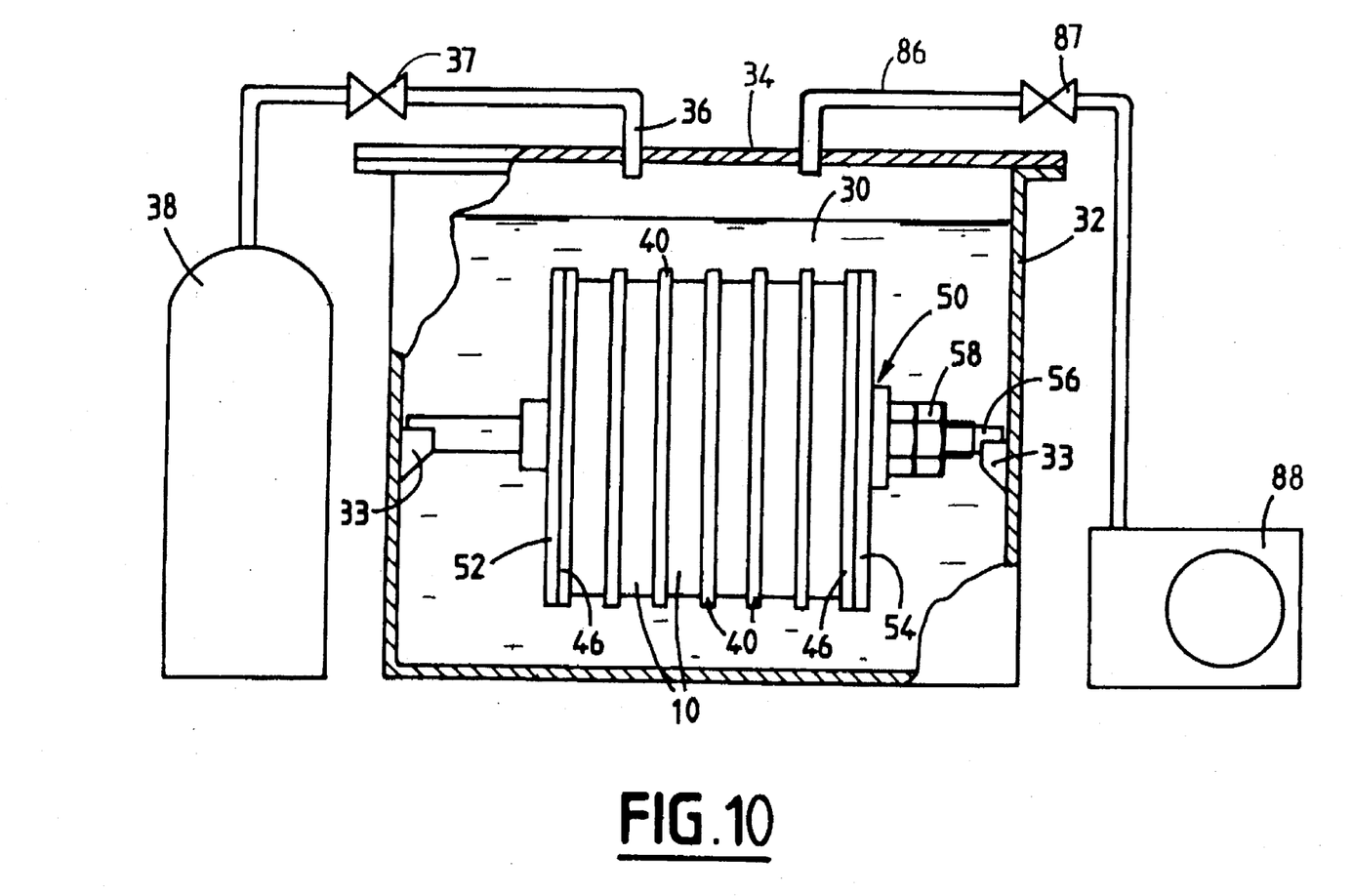
FIG. 10 is a schematic view illustrating a third implementation of the process of the invention.
Figure 11:
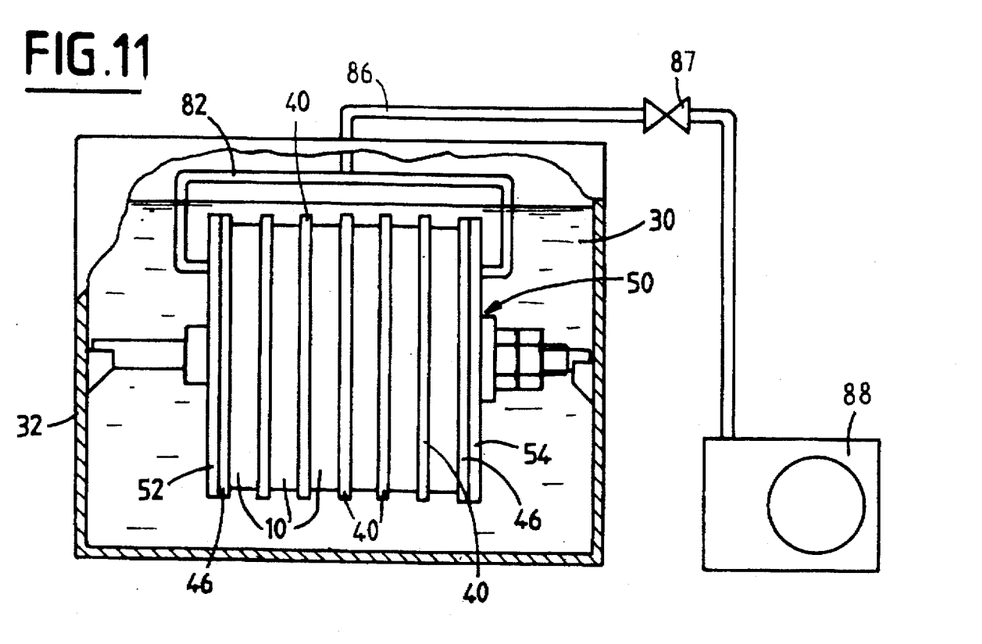
FIG. 11 is a schematic view illustrating a fourth implementation of the process of the invention.
Figure 12:
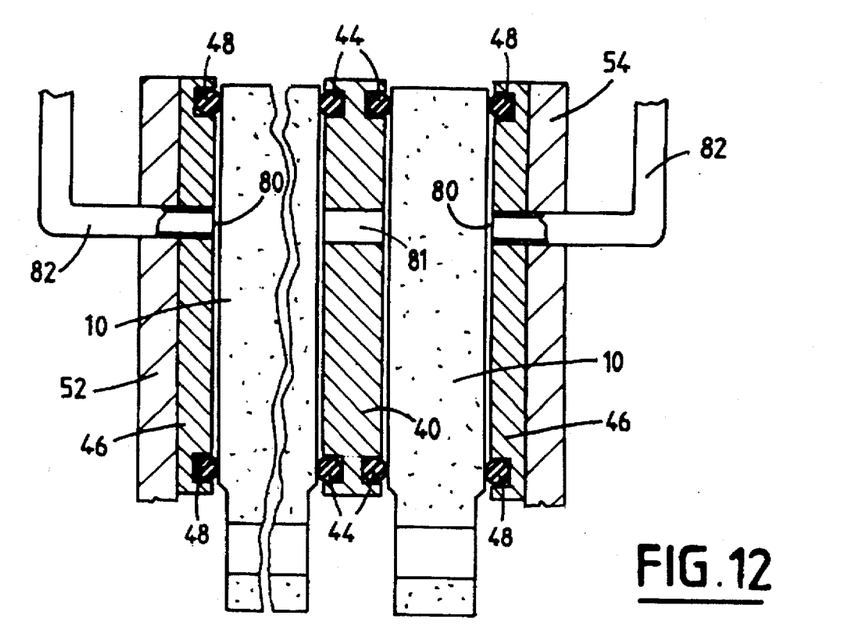
FIG. 12 is a detailed view, in partial cross-section, illustrating the formation of an underpressure in the internal open pore space of a disk from FIG. 11.

The pressure difference dP required for impregnation can be established not only by an overpressure acting on the exposed surfaces of the disks, but also at least partially by an underpressure established in the core of the internal open pore space of the disks, as shown in FIGS. 10 to 12.

In the embodiment shown in FIG. 10, the stator disks 10 to be impregnated are mounted in an apparatus which is identical to that of FIG. 4 and immersed in bath 30. The friction faces of the disks are masked by two end plates 46 provided with O-rings 48 and intermediate plates 40 provided with O-rings 44. The sealing plates, identical to those in FIGS. 4 and 5, are applied against the friction faces of the disks by tightening the assembly between plates 52, 54 of apparatus 50.

Tank 32 is sealed by cover 34 through which channel 86 passes, connecting tank 32 to a vacuum source 88 via a valve 87. Tank 32 is also connected to a pressure source 38 by means of a channel 36 on which a valve 37 is mounted, as in the embodiment shown in FIG. 4.

After immersion of disks 10 clamped in apparatus 50, with their friction faces masked, an underpressure is established in tank 32 by opening valve 87, valve 37 being closed. This underpressure is limited in order not to completely evacuate the internal pore space of the disks of the air it initially contained. When the pressure in the tank has been reduced to a value d'P, valve 87 is closed and valve 37 is opened to increase the pressure in the tank to a greater value d"P to the initial ambient pressure. Thus a pressure difference dP=d'P+d"P is established between the internal pore space of the disks and the exposed surfaces. This pressure difference enables impregnation to be carried out to the desired depth.

It is possible to return tank 32 to ambient pressure after establishing the underpressure and closing valve 37 without creating an overpressure therein. The impregnation depth is then a function of the pressure difference d'P.

The fact that a pressure which is lower than the ambient pressure is established in the core of the internal pore space of the disks before impregnation counters expulsion of the impregnating composition from the disks when the disks are removed from the impregnating bath and the pressure between the interior and exterior of the disks is equalized again.

In the embodiment shown in FIGS. 11 and 12, the stator disks 10 to be impregnated are mounted in an apparatus 50 which is similar to that of FIG. 4 and immersed in bath 30. The friction faces of the disks are masked by two end plates 46 provided with O-rings 48 and an intermediate plate 40 provided with O-rings 44. The sealing plates, which are similar to those in FIGS. 4 and 5, are applied against the friction faces of the disks by tightening the assembly between plates 52, 54 of apparatus 50.

A sealed connector is formed through each end plate 46 and passages 81 are formed in intermediate plates 40. The sealed connectors 80 are connected by conduits 82 to a line 86 connected to a vacuum source 88 via a valve 87. Connectors 80 are accessible through passages formed in plates 52, 54. Opening valve 87 places the vacuum source in communication with the space between each end plate 46 and the friction face which faces it and which is sealed and isolated from the impregnating composition bath. By communication through the porous disks and passages 81, an underpressure is thus established in the internal open pore space of all the disks, allowing impregnation by the composition contained in bath 30, which remains exposed to ambient pressure.

When impregnation is finished, valve 87 is closed, maintaining the underpressure in the internal pore space of the disks. Bath 30 is emptied to allow the disks to dry. Maintaining the underpressure counters expulsion of the impregnating composition from the pore space in the disk, even when the composition is very fluid.

It should be noted that a single sealed connector 80 through one of the two end plates is sufficient to establish an underpressure in all of the internal porosities of the disks. It is also possible to provide one or more lateral connectors so that the spaces between intermediate sealing plates and adjacent friction faces can be accessed.

In the embodiments described above, the impregnation rate is higher when several disks are impregnated simultaneously, but the possibility of impregnating disks individually is not excluded.

Returning to FIG. 1, it can be seen that it is necessary to form oxidation protection to one side of the outer faces of end stator disks $10_1$, $10_2$. These cannot be differentiated during impregnation, and their outer surfaces are masked as if they were friction faces. After impregnation and formation of the internal protection, it is then necessary to provide the outer surfaces with oxidation protection. This can be effected by depositing a protective surface coating in known fashion.

Even when the end stator disks are differentiated during impregnation and placed, for example, at the ends of the assembly of disks immersed in the impregnating composition bath, their outer non friction faces are at least partially masked by the disk holding apparatus. A specific protection in the form of a deposit coating the surface is still necessary. It can, however, be arranged that the portions of the outer non friction faces masked by the apparatus are reduced, for example by using end plates which press very locally on the outer surfaces. Substantial infiltration from this can thus take place, with formation of an internal oxidation protection, which can then be completed by an external protection.

The impregnation of stator disks has been described above. It is, of course, immediately clear that rotor disks 20 can be impregnated in exactly the same way. It is also possible, by using the same masking means for the friction faces, to simultaneously impregnate an assembly of stator and rotor disks.

Further, it is clear that the invention can be applied to the formation of an internal oxidation protection in brake disks of carbon-containing composite material other than those for aircraft brakes, for example disks for single-disk brakes or multiple-disk brakes for ground vehicles.

By way of non limiting example, brake disks are impregnated with a solution of precursor salts of a glass-containing composition with self-healing properties at the operating temperature of the disks, such as a glass-containing phosphate based composition.

Preferably, the internal protection is constituted by a glass-containing composition with the following composition in moles of oxides:

20% to 60%, preferably 20% to 50%, of $P_2O_5$;
10% to 30% of ZnO;
10% to 30% of $Na_2O$;
0 to 20% of at least one oxide selected from CuO, CoO, NiO, FeO, MgO and PbO;
0 to 15% of at least one alkali metal oxide selected from $Li_2O$ and $K_2O$;
0 to 20%, preferably 0 to 15%, of at least one oxide selected from $Bi_2O_3$, $Al_2O_3$ and $B_2O_3$; and
0 to 5% of at least one oxide selected from $V_2O_5$ and $TiO_2$.

As already indicated, in order to provide the glass-containing composition with good resistance to corrosion by moisture, it is preferable that the molar ratio between the modifying oxides and the forming oxides, principally comprising or consisting of $P_2O_5$, is at least 0.6 and preferably at least 0.9.

Thus in order to obtain a stable aqueous impregnating solution, without forming precipitates of phosphates, it is recommended that the solution is formed by first dissolving in water, a polyphosphate which will then, by complexing, allow the dissolution of the required quantity of precursor salts of the modifying oxides to produce a high concentration of precursor salts in the solution. The polyphosphate which is dissolved first is advantageously sodium metaphosphate or trimetaphosphate. The zinc salt which is then added is preferably zinc nitrate or zinc sulfate.

Other precursors are added to the solution, depending on the desired composition of the glass-containing composition and/or to provide the required acidity.

Two examples of implementations of the present invention will now be described.

EXAMPLE 1

Stator disks for aircraft brakes were made conventionally from carbon-carbon composite with inner and outer diameters of 247 mm and 420 mm, a thickness of 26 mm and a residual internal pore space of about 10% by volume. After machining the notches in the inner ring of the disks, six disks were assembled coaxially using an apparatus 50 as shown in FIG. 4. The friction faces of the disks were masked and sealed against liquids using annular end sealing plates 46 and intermediate plates 40 provided with rubber O-rings as shown in FIGS. 4 and 5. Plates 46 and 40 were formed from an aluminum alloy with a PTFE (polytetrafluoroethylene)

coating. Their inner and outer diameters were respectively 270 mm and 430 mm while those of the friction faces of the disks were respectively 280 mm and 420 mm.

The disks mounted in apparatus 50 were immersed in a bath 30 constituted by an aqueous solution of precursors of a phosphate based glass. The solution had the following composition, in weight percent (the figure in parentheses indicates the order of introduction of the precursors of the constituent oxides of the glass):

$H_2O$: 42.5%
$NaPO_3$ (1): 16.6%
$Zn(NO_3)_2,6H_2O$ (2): 20.7%
$KH_2PO_4$ (3): 6.5%
$H3BO_3$ (4): 1.6%
$H_6NPO_4$ (5): 12.1%

The acidity of the solution was mainly controlled by potassium dihydrogen phosphate $KH_2PO_4$. In this example, the pH of the solution was about 0.3.

The disks were immersed in bath 30 for 5 minutes, during which an overpressure (dP) of $10^4$ Pa (0.1 atmospheres) was established in tank 32, with respect to the initial ambient pressure. Impregnation of the above solution was then carried out to an average depth of about 5 mm from the exposed surfaces of the disks.

The impregnated disks were removed from the bath, freed from apparatus 50 and oven dried before heat treatment in a neutral atmosphere at a temperature of about 750° C.

An internal oxidation protection constituted by a phosphate based glass (glass 1) was thus formed, which had the following composition in molar percentages of oxides:

$P_2O_5$: 45.6%
ZnO: 20.2%
$Na_2O$: 23.5%
$K_2O$: 6.9%
$B_2O_3$: 3.8% which gave a molar ratio between the modifying oxides and the forming oxides ($P_2O_5$ and $B_2O_3$) of about 1.02.

FIG. 13 illustrates, in cross-section, that the internal oxidation protection (hatched zones) is localized to the non friction portions of a disk 10. A little internal protection 11 is present at the edges of friction faces 10a, 10b located at the edges of the non friction portions. This limited presence does not adversely affect the tribological characteristics.

In order to measure the effectiveness of the internal protection produced, samples of carbon-carbon composite material identical to the material of the above disks was used. A portion of the samples was impregnated with the aqueous solution described above, the precursor for the same phosphate based glass. After drying and heat treatment under the same conditions, the relative weight of the glass formed in the samples was 2%.

A portion of the samples with the internal protection was polluted with potassium acetate, which is a catalyst for carbon oxidation.

Samples A which had the internal oxidation protection and pollution by potassium acetate and samples B provided with an internal oxidation protection but not polluted by potassium acetate were kept in air at 650° C. for 5 hours. An identical oxidation treatment was applied to the same samples with no oxidation protection, some with no pollution by potassium acetate (samples C) and others with pollution by potassium acetate (samples D). Following this oxidation treatment, the average relative weight loss for each series of samples was measured, giving the following results:

samples A: 0.1%
samples B: 0.3%
samples C: 5%
samples D: 99%

The effectiveness of the oxidation protection of the invention can thus be seen, even in the presence of a catalyst. The ability to protect against the oxidation of carbon and the catalytic oxidation of carbon is important in the case of brake disks, in particular aircraft brakes. They are subject to pollution by carbon oxidation catalysts such as sea salt or runway de-icing substances.

Resistance to corrosion by moisture was measured by keeping samples with internal oxidation protection identical to samples B above in water at ambient temperature for 16 hours. The corrosion rate measured as a percentage of the weight loss was 1.87%/hour.

By way of comparison, the corrosion rate measured under the same conditions, with the same carbon-carbon samples provided with an internal protection produced by impregnating with an aqueous solution of sodium and potassium phosphates, as described in FR-A-2 685 694, was 10%/minute.

EXAMPLE 2

The procedure of Example 1 was followed except for the addition to the impregnating solution of a 50% concentrated solution of aluminum dihydrogen phosphate $AlH_2PO_4$ in a proportion of 30% by weight. After heat treatment, the composition obtained (glass 2) had the following composition, in molar percentages of oxides:

$P_2O_5$: 46.3%
ZnO: 16.2%
$Na_2O$: 20.3%
$K_2O$: 5.9%
$B_2O_3$: 3.3%
$Al_2O_3$: 7% which gave a molar ratio between the modifying oxides and the forming oxides ($P_2O_5$ and $B_2O_3$) of about 1.02.

In order to test the effectiveness of the oxidation protection and the resistance to corrosion by water of the internal protection formed, carbon-carbon composite material samples identical to the disk material in Example 1 were tested. Samples I were provided with an internal protection constituted by glass 1 (Example 1) and samples II were provided with an internal protection constituted by glass 2 (Example 2) using the process described in Example 1.

The treated samples were kept in water at room temperature for 16 hours. The corrosion rates for the glasses, measured as a percentage of the weight loss, were:

for samples I (glass 1): 1.87%/hour
for samples II (glass 2): 0.03%/hour.

The presence of alumina substantially increased the resistance to corrosion by water.

The same samples were kept for 15 hours at 650° C. in air. The relative weight losses measured were as follows:

for samples I (glass 1): 0.38%
for samples II (glass 2): 0.31%.

It can be seen that the oxidation protection was retained (and even slightly improved) while substantially improving the moisture resistance.

While Example 1 envisaged carrying out the heat treatment in a neutral atmosphere, it could have been carried out in a reactive atmosphere, for example a nitriding atmosphere, in a mixture of ammonia and hydrogen ($NH_3$+ $H_2$). Nitriding the glass can further increase the resistance to corrosion by moisture.

The above examples have shown the effectiveness of the internal protection against oxidation and catalytic oxidation of carbon with a high resistance to corrosion by moisture.

This does not exclude the possibility of combining this internal protection with an external oxidation protection in the form of a surface coating fixed in the superficial pore space of the material. This external protection, which is preferably compatible with the internal protection, is effected, for example, by spraying or painting a composition in the form of a solution or suspension of external protection precursors which, after drying, undergo heat treatment. The composition containing the precursors for the external protection can be used after impregnation with the internal protection precursor composition and any required drying, the internal and external protections then being generated by the same heat treatment step.

In order to ensure physico-chemical compatibility between the internal and external protections, it is advantageous to use an analogous composition to the internal protection precursor impregnating composition for the external protection precursor composition. A variety of constituents can be added, in suspension or in solution, to provide the external protection with specific properties. Thus refractory oxides, for example colloidal silica ($SiO_2$), can be added to improve the resistance of the external protection to high temperatures, compared with the internal protection, thus broadening the operating temperature range of the material.

This type of external protection could be used for the non friction faces opposite the friction faces of stator disks located at the extremities of a multibrake disk.

We claim:

1. A process for protecting against oxidation a brake disk having at least one friction face and made of carbon-containing composite material having residual internal open porosity, said process comprising the steps of:

masking each friction face of the brake disk to seal and isolate said friction face from outside non-masked surfaces of the disk;

immersing the brake disk in a bath containing an impregnation composition including at least one substance which forms or is a precursor to an oxidation protection material; and impregnating the composite material of the brake disk with said impregnation composition by creating a pressure difference between outside the non-masked surfaces of the disk and inside the internal porosity of the disk, while keeping an amount of air inside said internal porosity;

whereby said impregnation composition is forced to penetrate into the internal porosity of the brake disk through and over a limited depth below the non-masked surfaces without reaching a first portion of the volume of the disk below each friction face in an amount sufficient to adversely affect tribological characteristics of the brake disk, to form an internal protection against oxidation within a second portion of the volume of the disk below surfaces other than the friction faces and not including the first portion below each friction face.

2. A process according to claim 1, characterized in that the pressure difference is selected to achieve a desired depth of penetration of the impregnating composition into the internal porosity.

3. A process according to claim 2, characterized in that the pressure difference is adjusted to allow the impregnating composition to penetrate to a depth of between about 2 millimeters (mm) and about 10 mm.

4. A process according to claim 1, characterized in that a pressure which is greater than within the internal porosity of the brake disk prior to its immersion is established outside the non-sealed surfaces of the immersed brake disk.

5. A process according to claim 4, characterized in that the brake disk is immersed in the bath in a vessel in which said greater pressure is established.

6. A process according to claim 5, characterized in that the brake disk immersed in the bath is covered by a height of liquid corresponding to said greater pressure to be established.

7. A process according to claim 1, characterized in that the impregnating composition has a viscosity of between about 0.1 dPa.s and about 10 dPa.s.

8. A process according to claim 1, characterized in that a pressure is established in the internal porosity of the brake disk which is lower than within the internal porosity of the brake disk prior to its immersion.

9. A process according to claim 8, characterized in that the brake disk is immersed in the bath in a vessel and a first pressure is established in the vessel which is lower than the initial ambient pressure therein followed by a second pressure which is greater than the first pressure.

10. A process according to claim 9, characterized in that the second pressure is ambient pressure.

11. A process according to claim 8, characterized in that the lower pressure is established by placing at least one masked friction face of a disk in communication with a vacuum source.

12. A process according to claim 8, characterized in that the lower pressure is maintained in the internal porosity of the disk after the end of the impregnation step.

13. A process according to claim 1, characterized in that the brake disk is rotated in the impregnating composition bath about a horizontal axis to make the penetration depth of the impregnating composition uniform.

14. A process according to claim 1, characterized in that masking of a friction face is effected by means of a plate which is applied to and is liquid tight at least over the periphery of the friction face.

15. A process according to claim 14, characterized in that the plate is rigid and provided with a seal which is applied to the circumference of the friction face.

16. A process according to claim 14, characterized in that the plate comprises, along its periphery, at least one bead which forms the seal applied to the circumference of the friction face.

17. A process according to claim 14, characterized in that the plate is a sheet of elastically deformable material pressed against the friction face.

18. A process according to claim 14, characterized in that the plate is held and sealed against the friction face by means of a clamping apparatus.

19. A process according to claim 1, characterized in that the friction face is masked by applying a surface coating which is eliminated before the brake disk enters service.

20. A process according to claim 19, characterized in that the surface coating is applied by spraying.

21. A process according to claim 19, characterized in that the surface coating is eliminated by machining.

22. A process according to claim 1, characterized in that the friction face is masked by depositing a layer of rubber which is eliminated by peeling before the brake disk enters service.

23. A process according to claim 22, for applying an oxidation protection to a brake disk for mounting at the end of a pack of stator disks alternating with rotor disks, and comprising a non friction outer surface opposite an inner friction face, characterized in that the non friction face is at least partially masked during the impregnation step and, after formation of the internal oxidation protection, is provided with a surface coating which protects against oxidation.

24. A process according to claim 1, characterized in that several brake disks are simultaneously immersed in the impregnating composition bath, each friction face being masked.

25. A process according to claim 24, characterized in that the brake disks are disposed coaxially and assembled in an apparatus.

26. A process according to claim 25, characterized in that two facing friction faces are masked by means of a single plate which is applied to and is liquid tight at least about the circumference of each of the two friction faces.

27. A process according to claim 1, characterized in that an impregnating composition constituted by a solution containing precursors of the material for an internal oxidation protection is used and in that, after impregnation, the disk is dried then heat treated.

28. A process according to claim 27, characterized in that the impregnating composition is constituted by a solution containing precursors of a glass-containing composition which is self-healing in the carbon oxidation range.

29. A process according to claim 28, characterized in that the impregnating composition is constituted by a solution containing phosphates in order to form a phosphate based glass-containing composition.

30. A process according to claim 29, characterized in that the impregnating composition is constituted by a solution containing phosphates and at least one zinc oxide precursor.

31. A process according to claim 30, characterized in that the impregnating solution is formed by firstly dissolving in water a polyphosphate selected from sodium metaphosphate and trimetaphosphate, then dissolving a zinc salt selected from zinc nitrate and zinc sulfate.

32. A process according to claim 30, characterized in that the solution is acidic with a pH of less than 0.5.

33. A process according to claim 29, characterized in that the impregnating composition is constituted by an aqueous solution containing precursors of a glass-containing composition, which solution has the following composition, in number of moles of oxide:

20% to 60% of $P_2O_5$;

10% to 30% of ZnO;

10% to 30% of $Na_2O$;

0 to 20% of at least one oxide selected from CuO, CoO, NiO, FeO, MgO and PbO;

0 to 15% of at least one alkali metal oxide selected from $Li_2O$ and $K_2O$;

0 to 20% of at least one oxide selected from $Bi_2O_3$, $Al_2O_3$ and $B_2O_3$; and 0 to 5% of at least one oxide selected from $V_2O_5$ and $TiO_2$.

34. A process according to claim 33, characterized in that the glass-containing composition has the following composition in number of moles of oxide:

20% to 50% of $P_2O_5$;

10% to 30% of ZnO;

10% to 30% of $Na_2O$;

0 to 20% of at least one oxide selected from CuO, CoO, NiO, FeO, MgO and PbO;

0 to 15% of at least one alkali metal oxide selected from $Li_2O$ and $K_2O$;

0 to 15%, of at last one oxide selected from $Bi_2O_3$, $Al_2O_3$ and $B_2O_3$; and 0 to 5% of at least one oxide selected from $V_2O_5$ and $TiO_2$.

35. A process according to claim 33, characterized in that the ratio in number of moles of oxide between the glass modifying oxides comprising ZnO, and the glass forming oxides, comprising $P_2O_5$, is selected to achieve a desired resistance to corrosion by moisture.

36. A process according to claim 35, characterized in that said ratio is at least 0.6.

37. A process according to claim 35, characterized in that said ratio is at least 0.9.

38. A process according to claim 28, characterized in that the heat treatment is carried out in an atmosphere reactive to said glass-containing composition.

39. A process according to claim 28, characterized in that non friction surface portions of the brake disk outside each friction face are provided with an external oxidation protection by depositing a surface coating having a substantially same composition as said impregnating solution.

40. A process according to claim 39, characterized in that colloidal silica is added to said solution to form the external protection.

41. A process according to claim 1, characterized in that an impregnating composition is used which is constituted by a molten mixture of constituents of the material providing the internal oxidation protection.

42. A process according to claim 1, characterized in that an impregnating composition is used which is constituted by a mixture of powdered precursors of the constituents of the material forming the internal protection, in suspension in a liquid.

43. A process according to claim 1, characterized in that non friction surface portions of the brake disk outside each friction face are provided with an external oxidation protection.

* * * * *

UNITED STATES PATENT AND TRADEMARK OFFICE
CERTIFICATE OF CORRECTION

PATENT NO. : 5,686,144
DATED : November 11, 1997
INVENTOR(S) : Jacques Thebault et al.

Page 1 of 1

It is certified that error appears in the above-identified patent and that said Letters Patent is hereby corrected as shown below:

Column 10,
Line 8, "it sufficient" should read -- it is sufficient --;

Column 13,
Line 14, "H3BO₃" should read -- $H_3BO_3$ --; and

Column 18,
Line 11, "last" should read -- least --.

Signed and Sealed this

Twelfth Day of March, 2002

*Attest:*

JAMES E. ROGAN
*Attesting Officer*   *Director of the United States Patent and Trademark Office*